United States Patent [19]

Nelson

[11] Patent Number: 4,898,208

[45] Date of Patent: Feb. 6, 1990

[54] INJECTOR VALVE

[75] Inventor: George C. Nelson, York, Nebr.

[73] Assignee: Cyclonaire Corporation, York, Nebr.

[21] Appl. No.: 347,418

[22] Filed: May 4, 1989

Related U.S. Application Data

[63] Continuation of Ser. No. 292,381, Dec. 30, 1988, abandoned.

[51] Int. Cl.$^4$ .................................................. F16K 15/14
[52] U.S. Cl. ................................ 137/614.2; 137/853; 251/223; 406/192
[58] Field of Search .................... 137/614.2, 853, 860, 137/599; 251/223, 225; 406/192, 194

[56] References Cited

U.S. PATENT DOCUMENTS

| | | | |
|---|---|---|---|
| 2,052,373 | 8/1936 | Walker | 251/223 |
| 2,306,714 | 12/1942 | Rowell | 137/614.2 |
| 2,403,751 | 7/1946 | Palmer | 302/1 |
| 2,866,477 | 12/1958 | Bredtschneider et al. | 137/614.2 |
| 2,941,541 | 6/1960 | Pepas | 137/853 |
| 3,443,789 | 5/1969 | Glasgow et al. | 251/223 |
| 3,708,207 | 1/1973 | Steele | 406/192 |
| 3,799,193 | 3/1974 | Greenwood et al. | 137/525 |
| 3,876,259 | 4/1975 | Gunderson | 302/24 |
| 4,063,555 | 12/1977 | Ulinder | 128/214 |
| 4,300,593 | 11/1981 | Ritter | 137/853 |
| 4,313,699 | 2/1982 | Steele | 406/93 |
| 4,346,704 | 8/1982 | Kulle | 137/860 |
| 4,582,081 | 4/1986 | Fillman | 137/218 |
| 4,708,535 | 11/1987 | Steele | 406/93 |

Primary Examiner—A. Michael Chambers
Attorney, Agent, or Firm—Welsh & Katz, Ltd.

[57] ABSTRACT

An injector valve for passing air into a pneumatic conveying system for particulate solids includes a housing having an inlet chamber and a discharge chamber. A hollow seating element is mounted in the discharge chamber. The seating element has a hollow cylindrical section in fluid communication with the inlet chamber and a conical forward section. At least one fluid outlet opening extends from the hollow within the seating element to the outer surface of the seating element cylindrical section. A flexible elastomeric annular boot is mounted on the outside surface of the seating element. The boot has a conical forward portion in contact with the outer surface of the seating element conical forward section, and a cylindrical rearward portion in contact with the outer surface of the seating element cylindrical section, so that fluid entering the inlet chamber passes into the hollow of the seating element and through the outlet opening of the seating element to stretch and flex the annular boot away from the outside surface of the seating element to allow flowing fluid to exit from the forward end of the boot conical forward portion and pass into the discharge chamber.

23 Claims, 2 Drawing Sheets

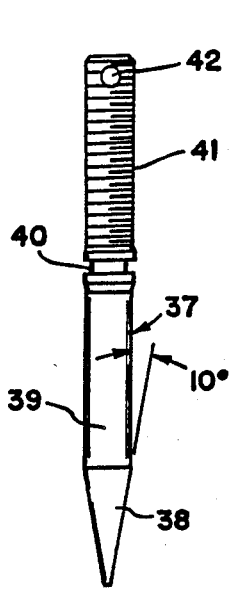
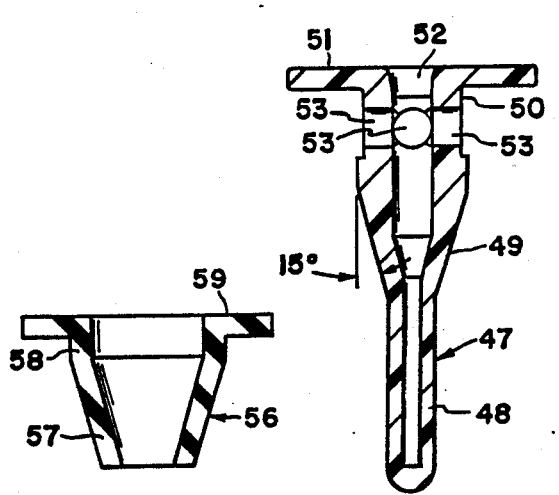
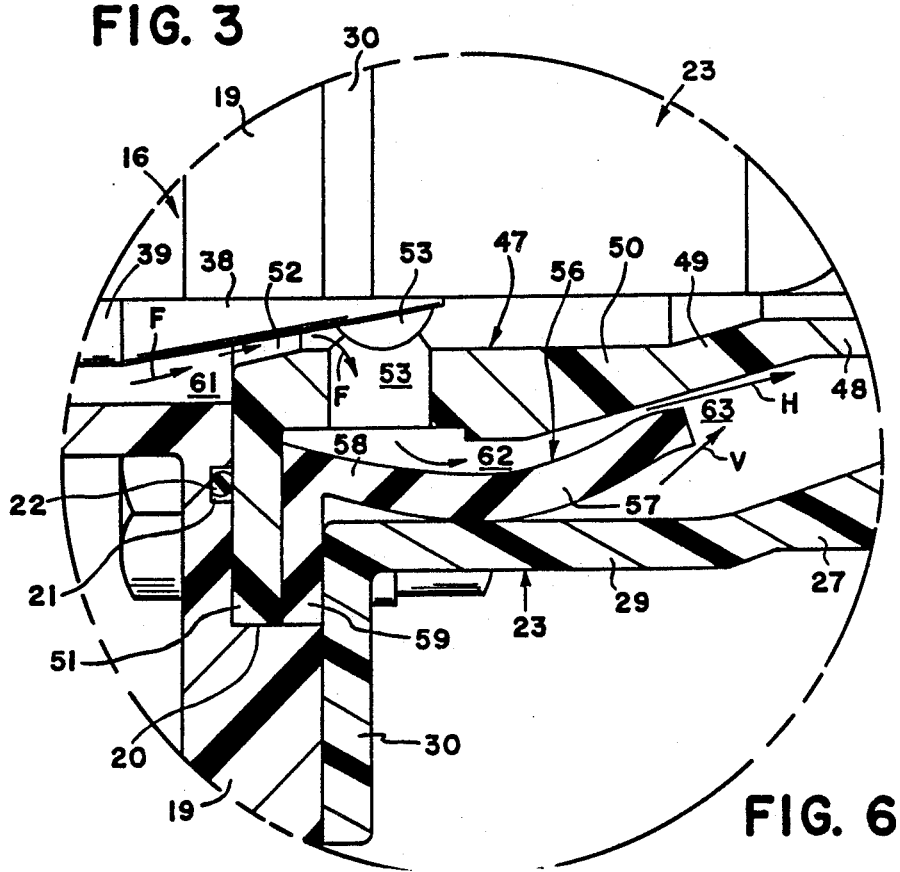

INJECTOR VALVE

This is a continuation of application Ser. No. 292,381, filed Dec. 30, 1988, now abandoned.

BACKGROUND OF THE INVENTION

The present invention relates to a valve for fluid flow and, in particular, to an injector valve for boosting air flow and air pressure in a pneumatic conveyor system.

Pneumatic conveyors are often employed for a wide variety of applications, including the transfer of dry granular materials such as sand, salt, grain, flour and cement. Two types of systems are generally used for the transfer of granular materials. They are "dilute phase" systems and "dense phase" systems.

A dilute phase system depends upon a high velocity air stream to carry a relatively small amount of material at high speeds. Serious disadvantages often accompany this method. The high speed of the particles also tends to abrade the interior surfaces of the conveyor tubes and other equipment. Hence, maintenance is often a necessity and frequent operational shut-downs are often required to repair and replace parts. In addition, the high velocity impacts which are unavoidable in this type of system tend to destroy the transported material by reducing it to an undesirably low grain size, thereby causing the formation of fines and dust.

A preferred type of pneumatic conveyor which avoids many of these problems is the dense phase system. This is a slow speed system in which the conveyor tube is practically full of particulate material and the material is moved by air pressure applied to it at its source and at a number of successive locations along the conveyor tube. Although the speed of the material is less, the density is so much higher that the net volume of material moved per unit of time is usually much higher than in the high speed dilute phase system. Furthermore, wear is reduced on the conveyor tube and the material being transported is usually damaged to a lesser degree.

The present invention relates to the injector valves or booster valves which are positioned along the conveyor tube of a dense phase system. Some prior art injector valves are extremely difficult to adjust. If too much pressure is applied, the material in the conveyor is blocked. On the other hand, if the pressure is too low, the material is not properly transported. Since the proper applied pressure depends upon the pressure inside the conveyor tube, and since the pressure in the tube varies with the material density, flow rate, consistency, and the pressure applied by adjacent injector valves, it is readily apparent that it is often difficult to achieve the correct pressure. Continual adjustments are often necessary to maintain the careful balance of the system.

One method of simplifying this type of pneumatic conveyor system is to employ one-way valves in the booster stations which operate to release pressurized gas into the conveyor tube when the pressure in the tube drops below a predetermined value. However, these valves often become clogged due to particulate material in the conduit leading from the one-way booster valve to the conveyor tube backing up into the valve before it can close. The backed up particulate matter soon scores the sealing surfaces of the valve and valve replacement becomes necessary.

Accordingly, it is an object of the present invention to provide an improved injector valve for adding pneumatic pressure or gas flow, as required, in order to keep particulate matter moving steadily through a pneumatic conveyor tube.

It is another object of the present invention to provide an improved one-way injector valve for a booster station which operates to release pressurized gas into the pneumatic conveyor tube when the pressure in the conveyor tube drops below a predetermined level.

It is another object of the present invention to provide an improved injector valve which does not experience the clogging that is commonly caused by conveyed particulate matter backing into the valve before it can close.

Other objects and advantages of the present invention will become apparent from the following detailed description, in conjunction with the illustrated drawings, in which:

FIG. 3 is a side elevational view of the valve spindle element of the inventive valve assembly of FIG. 2;

FIG. 4 is a cross-sectional side elevational view of the valve seating element of the injector valve of FIG. 2;

FIG. 5 is a cross-sectional side elevational view of the annular boot element for the injector valve of FIG. 2; and, FIG. 6 is an enlarged view of the injector valve assembly taken within the viewing circle A of FIG. 2, which shows the fluid flow within the valve assembly.

SUMMARY OF THE INVENTION

Figure 1:
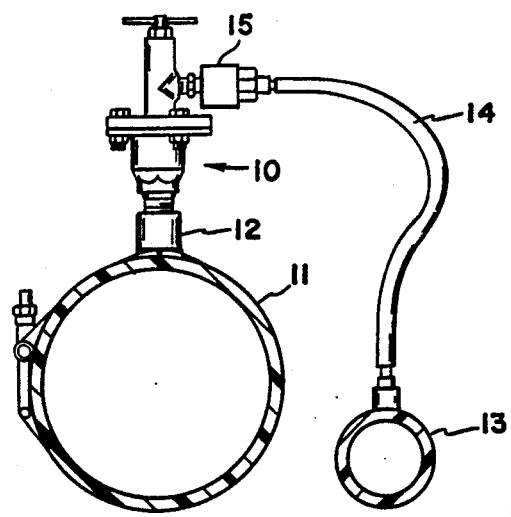
FIG. 1 is a simplified schematic representation, shown partially in section, of a typical installation of an injector valve of the present invention.

Broadly stated, the present invention provides a valve assembly that is particularly suitable for use as an injector valve in a pneumatic conveying system for particulate solids. The valve comprises a housing containing a chamber structurally divided into a chamber inlet section and a chamber discharge section. The chamber inlet section contains a fluid inlet opening, and the chamber discharge section contains a fluid discharge opening. A hollow seating element (FIG. 4) is located in the chamber discharge section. The seating element has a hollow cylindrical section near the chamber inlet section and a conical section extending forwardly therefrom. Fluid communicates between the chamber inlet section and the hollow within the cylindrical section of the seating element, and at least one fluid outlet opening communicates fluid from the hollow to the outer surface of the cylindrical section. A flexible elastomeric annular boot FIG. 5) is mounted on the outside surface of the seating element. The boot has a conical forward portion in contact with the outer surface of the seating element conical forward section, and it has a cylindrical rearward portion in contact with the outer surface of the seating element cylindrical section. Fluid from the hollow of the seating element passes through the outlet openings of the seating element to stretch and flex the annular boot away from the outside surface of the seating element to allow flowing fluid to exit the valve through the discharge opening.

To control the fluid flow through the valve assembly, a needle valve is provided which is manually adjustable, and which cooperates with a seat surface near the inlet side of the seating element. By manipulating the needle valve, the volume and pressure of the fluid that is admitted to the valve assembly can be controlled for optimum efficiency of the assembly.

In accordance with an important aspect of the present invention, the shape of the annular boot is such that when pressurized fluid is applied to the valve assembly and exits the hollow, it stretches and flexes the annular flexible boot away from the outside surface of the sealing element in such a way that it is believed that the cylindrical portion is expanded, and at some pressure level the conical portion is then expanded to release a pulse of fluid which exits the valve through the discharge opening. This pulsing flow occurs at a frequency that is adjustable by adjusting the needle valve at the input of the valve. The pulsing action has been found to greatly contribute to the overall efficiency of the operation of the pneumatic system.

In accordance with another important aspect of the present invention, the shape of the outer surface of the sealing element relative to the inside surface of the outer housing is such that the annular spacing between the two surfaces reduces toward the outlet side of the valve assembly. This has the effect of creating a venturi effect which increases the velocity of the fluid as it travels downstream toward the discharge end of the valve assembly. The higher velocity fluid flow at the discharge end of the conical portion produced by the venturi effect results in a cleaning action around the flexible annular boot so that the space around the boot is kept clear of particulate matter. Even though the valve assembly is mounted in FIG. 1 so that gravitational forces aid in directing material into the conveying line, it has been found that the valve assembly can be mounted upside down and the material does not accumulate in the housing, which is an indication of the efficiency of the operation of the venturi effect in keeping the housing clear of material.

DESCRIPTION OF THE PREFERRED EMBODIMENTS

Figure 2:
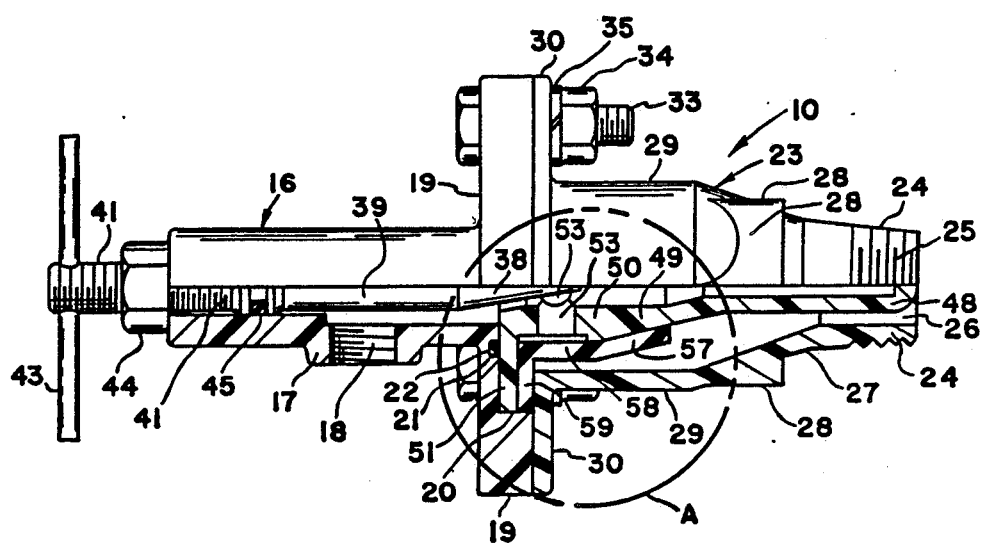
FIG. 2 is a side elevational view, shown partially in section, of the injector valve assembly of the present invention.

Turning now to the drawings, and particularly FIG. 1, an injector valve assembly 10 according to the present invention is shown together with a conveying line 11 for transporting particulate matter is shown in section. This conveying line may be 4 or more inches in diameter. The line has a plurality of inlet nozzles or couplings 12 along its length, one of which is shown in FIG. 1. The injector valve assembly 10 of the present invention is screwed into the coupling or inlet nozzle 12 at each location along the conveyor line 11. Running parallel to the conveying line 11 is an air supply header 13. At each location where an injector valve assembly is mounted on the conveying line 11 an air supply feeder conduit 14 runs from the air supply header 13 to the injector valve assembly 10. The air supply feeder conduit 14 is connected to the injector valve assembly by a conduit connector assembly 15. FIG. 2 hows a side elevational view, partially in section, of the injector valve assembly of the present invention. The injector valve assembly has a housing inlet or top section 16 which is generally of a cylindrical configuration. The inlet housing 16 contains a boss 17 which contains an air inlet. The bore of the air inlet 18 has an inside surface which is threaded with a nominal ¼ inch pipe thread. The inlet housing 16 includes a circular flange 19 which contains a circular recess 20. The circular recess 20 is a full diameter cut-out in the face of the flange 19. In addition, a narrow circular recess 21 is provided in the bottom of the circular recess 20 for holding a sealing O-ring 22.

A housing bottom or discharge section 23 is secured to the inlet housing 16. The discharge housing 23 includes a cylindrical outlet portion 24 having external threads 25, typically of a ½ inch nominal pipe size. The cylindrical outlet portion 24 also contains a central bore or discharge opening 26 which has an annular configuration. The housing discharge section 23 also includes a conical center portion 27. External flat surfaces 28 are provided on the conical center portion 27 in order to provide gripping surfaces for the application of a wrench for tightening the threads 25 into the inlet nozzle 12 of the conveyor line 11 of FIG. 1. The discharge housing 23 also includes a cylindrical entry portion 29. A circular flange 30 surrounds the cylindrical entry portion 29 and is attached to the circular flange 19 of the inlet housing 16 by means of a plurality of threaded bolts 33 and hexagonal nuts 34. The bolts 33 have a threaded shaft and a hexagonal head. The hexagonal nut 34 is mounted on the threaded portion of the bolt 33 and screwed down on the bolt to secure the flanges 19 and 30 together by pinching a lock washer 35 between the circular flange 30 and the hexagonal nut 34. As shown in FIG. 1, the flanges are thereby bolted in three places, but four or more nuts and bolts may be provided, depending upon the size of the injector valve 10 and its flanges.

Referring now to FIGS. 2 and 3, it is shown that the valve assembly 10 contains a valve spindle or needle stem 37 which is located in the inlet housing 16 of the valve assembly. The valve spindle has a conical end portion 38, which is generally angled at about 10 degrees from the longitudinal axis of the cylindrical center section 39 of the spindle. Thus, the valve spindle provides a needle for enhanced flow control, and the injector valve is preferably a needle valve. The spindle also includes a central recess 40 (FIG. 3) for receiving an O-ring 45 in order to provide a pressure seal for the spindle, as shown in FIG. 2. The spindle further includes a threaded cylindrical shank 41, which mates with a threaded axial bore in the end of inlet housing 16. The shank 41 contains a hole 42 for receiving a rod or pin 43 for turning the spindle in order to adjust the penetration depth of the needle or conical end portion 38 into the valve seat. A lock nut 44 is provided for locking the spindle in place in order to hold the needle setting once the proper adjustment is obtained.

The conical end portion or needle 38 of the valve spindle 37 projects into a valve seating element 47 which is contained in the discharge housing 23. (See FIGS. 2 and 4. The valve seating element has a hollow cylindrical forward section 48 having a rounded end and a hollow central conical section 49 which is generally tapered at about 15 degrees. A hollow cylindrical inlet section is attached to the central conical section. The cylindrical inlet section contains a valve seat which is located proximate to the inlet housing. A circular flange 51 is sized to seat into the circular recess 20 of the flange 19 of the inlet housing 16. The valve seating element 47 also includes an air feed inlet opening 52 which has a 10° taper in order to provide a valve seat for the needle end 38 of the valve spindle 37. Four internal air flow outlet openings 53, only three of which are seen in FIGS. 2 and 4, are located on the hollow cylindrical inlet section 50. The four internal air flow outlet openings 53 are spaced 90° from each other.

Referring now to FIGS. 2 and 5, a flexible elastomeric annular boot 56 is mounted on the outer surface of the valve seating element 47. The flexible boot 56 has a hollow conical forward portion 57 and a hollow cylindrical rearward portion 58. A circular flange portion 59 surrounds the cylindrical portion 58. This flange portion 59 is fitted into the recess 20 of the flange 19 of the inlet housing 16 adjacent to the flange 51 of the valve seating element. When the flange 19 of the inlet housing 16 and the flange 30 of the discharge housing 24 are mated together, the elastomeric circular flange 59 of the flexible boot and the circular flange 51 of the valve seating element pressed tightly together and compress the O-ring 22 which is contained within the recess 21 of the flange 19, in order to provide a tight seal.

FIG. 6 is an enlarged view of the injector valve assembly taken within viewing circle A of FIG. 2, which shows the air flow within the valve assembly. An annular inlet high pressure air-space 61 exists around the needle or conical section 38 of the valve spindle 37. A high pressure air space 62 is also found between the flexible annular boot 16 and the valve seating element 47. A high pressure, low velocity air flow F is found in spaces 61 and 62. The air flow passes from the annular space 61 through the space between the valve seat 52 and the conical section or needle 38 of the valve spindle 37 and then enters each of the internal air flow outlet openings 53. The pressure of the flowing air expands the flexible resilient boot 56 to cause it to bubble outwardly and provide the high pressure in the space 62.

As the amount of air within the space 62 increases, the conical forward portion 57 of the flexible boot is caused to expand outwardly from the external surface of the central conical section 49 of the valve seating element 47. This causes high pressure air to be released from the space 62 through a narrowed opening as the conical forward portion 57 of the flexible boot 56 leaves the outer surface of the central conical section 49 of the valve seating element. Because the internal diameter of the forward end or tip of the conical forward portion 57 of the boot is substantially less than the internal diameter of the cylindrical rearward portion 58 of the boot, and less than the external diameter of the hollow cylindrical inlet section 50 of the valve seating element, the air pressure causes the tip of the flexible boot conical portion 57 to expand away from the outer surface of conical section 50 in an intermittent manner. Accordingly, the air flow H leaves the tip of the flexible boot conical section in a pulsing flow.

The pulsations of this air flow H have a very desireable effect in contributing to the continued movement of the particulate material that is being conveyed in the conveying line.

In addition, since the internal diameter of the tip of the conical portion 57 of the boot is less than the internal diameter of cylindrical rearward portion 58 of the annular boot, the air flow H which leaves the tip of the conical forward portion 57 of the flexible boot 56 is discharged at a velocity which is higher than the velocity of the air flow F. This conversion of potential (pressure) energy to kinetic energy creates a low pressure region or air space 63 at the tip of the conical forward portion 57 of the flexible boot. Thus, an induced low pressure venturi air flow V is caused by the high velocity air flow H. This induced air flow V assures that no particulate matter will accumulate in the annular space around the flexible boot 56.

The various elements of the structure for the injector valve assembly can be made of a metal or of a plastic. Metal, such as stainless steel or brass, may be used depending on the environment of use. However, it is preferred that the component parts of the injector valve assembly be injection molded of a fiberglass reinforced nylon. The flexible elastomeric boot 56 can be fabricated of any suitable elastomeric material which is appropriate for the environment of use. Rubber or plastic may be used, but it is preferred that the boot be formed of a silicone rubber or of neoprene. It is particularly preferred that the boot be formed of a pretensioned neoprene.

It will be readily perceived by those skilled in the art that the valve of the present invention will function as described herein even if there is no spindle with the conical or needle end. The valve will function as described if the needle valve or other throttling control means is external of the housing which contains the valve seating element with the flexible elastomeric annular boot mounted thereon.

Similarly, those skilled in the art will recognize that the full diameter circular recess 20 in the flange 19 of inlet housing 16, which contains flange 51 of valve seating element 47 and the flange 59 of annular boot 56, could alternatively be located in the flange 30 of the discharge housing 23. As a further alternative, flange 19 of the inlet housing could have a recess to hold flange 51 of the seating element 47 while flange 30 of the discharge housing could have a recess to hold the flange 59 of the annular boot 56.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. A valve assembly, for use as an injector valve in a pneumatic conveying system for particulate solids, the assembly being adapted to be connected to a source of pressurized fluid, the assembly comprising:

a hollow inlet housing containing a chamber and having a first opening for receiving the shank of a valve spindle, said housing having a fluid inlet opening for introducing pressurized fluid into the inlet housing chamber;

a hollow discharge housing secured to said inlet housing and containing a chamber, said discharge housing having a discharge opening for discharging fluid from the discharge housing chamber;

a hollow valve seating element mounted in the chamber of said discharge housing, said seating element having at least one outlet opening passing from the hollow of said seating element to the outer surface of said seating element, said seating element having a hollow cylindrical inlet section containing a valve seat, and having a conical section forward of said hollow inlet section;

isolating means about said seating element for isolating the chamber of said inlet housing from the chamber of said discharge housing;

a valve spindle sealably contained within the chamber of said inlet housing, said spindle having a shank movably mounted in said first opening, and having a forward end proximate said valve seat and shaped to sealably mate with said valve seat;

means for selectively moving said spindle to engage and withdraw said shaped forward end relative to said valve seat to selectively close and open the valve; and, a flexible elastomeric annular boot mounted on the outside surface of said valve seating element, said boot having a conical forward portion in contact with the outer surface of said seating element conical section, and having a cylindrical rearward portion in contact with the seating element cylindrical inlet section so that fluid entering the inlet housing when the valve is open passes through the valve seat, the hollow of the seating element, and the outlet opening of the seating element to stretch and flex the annular boot away from the outside surface of said seating element to allow flowing fluid to exit from the forward end of said conical forward portion of the boot and pass out of the valve assembly through the discharge opening.

2. The valve assembly according to claim 1 wherein said annular boot is stretched and flexed away from the outside surface of said seating element intermittently to allow flowing fluid to exit the valve assembly through the discharge opening in a pulsing flow.

3. The valve assembly of claim 1 wherein the annular boot has an internal diameter at the forward end of the conical forward portion which is substantially less than the internal diameter of the cylindrical rearward portion so that the velocity of a fluid exiting from the forward end of the conical portion is substantially greater than the velocity of the fluid flowing under the cylindrical rearward portion, and the high velocity fluid flow exiting the forward end of the conical portion causes an induced venturi fluid flow around the boot so that the space around the boot is kept clear of particulate matter.

4. The valve assembly according to claim 1 wherein said first opening, said seating element, said valve seat, said spindle, and said boot are axially aligned.

5. The valve assembly according to claim 4 wherein said discharge opening is also axially aligned.

6. The valve assembly according to claim 1 wherein said outlet opening is located in the hollow cylindrical inlet section of said seating element.

7. The valve assembly according to claim 6 wherein said cylindrical inlet section contains a plurality of outlet openings.

8. The valve assembly according to claim 1 wherein said inlet housing and said discharge housing include radial flanges secured to each other; said secured housing flanges include at least one radial recess; said seating element contains a radial flange confined within said radial recess; and said annular boot contains a radial flange within said recess abutting said seating element flange so that said seating element and said boot are securely mounted within the chamber of said discharge housing and isolate the chamber of said discharge housing from the chamber of said inlet housing.

9. The valve assembly according to claim 1 wherein the shaped forward end of said spindle and the mating valve seat are conical, whereby said valve is a needle valve.

10. The valve assembly according to claim 1 wherein said annular boot comprises a flexible elastomer selected from the group consisting of a rubber and a plastic.

11. The valve assembly according to claim 1 wherein said annular boot comprises a flexible elastomer selected from the group consisting of silicone rubber and neoprene.

12. The valve assembly according to claim 1 wherein said inlet housing chamber and said outlet housing chamber are annular.

13. The valve assembly according to claim 1 wherein said valve seat is positioned proximate said inlet housing.

14. The valve assembly according to claim 1 wherein said seating element is centrally mounted within the chamber of said discharge housing to provide an annular chamber.

15. The valve assembly according to claim 14 wherein said seating element extends into said discharge opening to provide an annular discharge opening.

16. A valve assembly, for use as an injector valve in a pneumatic conveying system for particulate solids, the assembly being adapted to be connected to a source of pressurized fluid, the assembly comprising:

a housing containing a chamber structurally divided into a chamber inlet section and a chamber discharge section, said inlet section containing a fluid inlet opening, and said discharge section containing a fluid discharge opening;

a hollow seating element mounted in said chamber discharge section, said seating element having a hollow cylindrical section proximate said chamber inlet section and a conical forward section extended into said chamber discharge section;

means for fluid communication between the chamber inlet section and the hollow within the cylindrical section of said seating element;

at least one fluid outlet opening extending from the hollow within said seating element cylindrical section to the outer surface of said cylindrical section; and, a flexible elastomeric annular boot mounted on the outside surface of said seating element, said boot having a conical forward portion in contact with the outer surface of said seating element conical forward section, and having a cylindrical rearward portion in contact with the outer surface of said seating element cylindrical section so that fluid entering the chamber inlet section when the valve is open passes into the hollow of said seating element and through the outlet opening of said seating element to stretch and flex said annular boot away from the outside surface of said seating element to allow flowing fluid to exit from the forward end of said conical forward portion of the boot and pass out of the valve through the discharge opening.

17. The valve according to claim 16 wherein said annular boot is stretched and flexed away from the outside surface of said seating element intermittently to allow flowing fluid to exit the valve through the discharge opening in a pulsing flow.

18. The valve of claim 16 wherein the annular boot has an internal diameter at the forward end of the conical forward portion which is substantially less than the diameter of the cylindrical rearward portion so that the velocity of a fluid exiting from the forward end of the conical portion is substantially greater than the velocity of the fluid flowing under the cylindrical rearward portion, and the high velocity fluid flow exiting the forward end of the conical portion causes an induced venturi fluid flow around the boot so that the space around the boot is kept clear of particulate matter.

19. The valve according to claim 16 wherein said seating element cylindrical section contains a plurality of outlet openings.

20. The valve according to claim 16 wherein said annular boot comprises a flexible elastomer selected from the group consisting of a rubber and a plastic.

21. The valve according to claim 16 wherein said annular boot comprises a flexible elastomer selected from the group consisting of silicone rubber and neoprene.

22. The valve according to claim 16 wherein said seating element is centrally mounted within said chamber discharge section to provide an annular chamber discharge section.

23. The valve according to claim 22 wherein said seating element extends into said discharge opening to provide an annular discharge opening.

* * * * *